Jan. 2, 1951     A. A. KOLLANDER     2,536,065

TOOL FOR SCALING FISH

Filed Jan. 8, 1947

Inventor

Alfred A. Kollander

By John E. Stryker

Attorney

Patented Jan. 2, 1951

2,536,065

UNITED STATES PATENT OFFICE 2,536,065

TOOL FOR SCALING FISH

Alfred A. Kollander, Stillwater, Minn.

Application January 8, 1947, Serial No. 720,735

6 Claims. (Cl. 17—7)

This invention relates to a simple, inexpensive and efficient tool for removing the scales from fish.

It is an object of the invention to provide a tool of this class which is adapted to collect the loose scales on the back or upper surface of the tool and to minimize the tendency of the scales to be projected in various directions as they are freed from the body of the fish.

A particular object is to provide a tool of the class described having a sharpened, undulating margin or edge portion which is guided and held at an acute angle to the surface to be scaled so that the scales pass readily up the inclined outer surface of the blade as they are freed from the fish and the blade does not cut or tear the fish skin.

A further and particular object is to provide in a fish scaler a blade of inverted spoon shape having a sharpened, undulating margin or edge portion defining a multiplicity of narrow spaced, chisel-like teeth adapted to pass readily under the individual scales of the fish.

Another object is to facilitate the operation of a tool of this class by providing an integral handle projecting obliquely upward from one side of a spoon-shaped blade.

The invention also includes certain other novel features of construction which will be more fully pointed out in the following specification and claims.

Referring to the accompanying drawing which illustrates by way of example and not for the purpose of limitation a preferred form of my invention:

Figure 1:
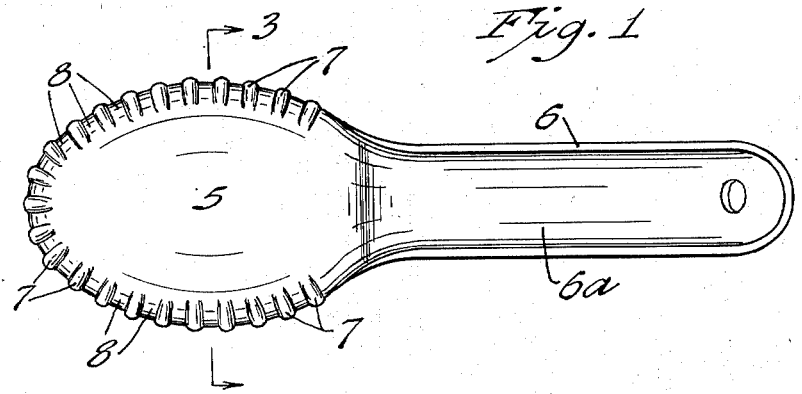
Figure 1 is a top plan view showing my device on a somewhat enlarged scale.
Figure 2:
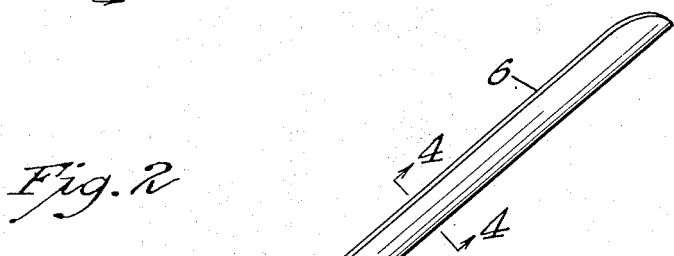
Fig. 2 is a side elevational view of the same.

In the drawing the numeral 5 indicates the blade of the tool and the numeral 6 a handle which projects obliquely upward from one side of the blade and is preferably integral therewith. The blade and handle may be die cut from suitable sheet metal. The blade 5 is of inverted spoon shape and has arcuate marginal portions formed with vertically undulated ridge members 7. A multiplicity of these upwardly projecting ridge members 7 alternate with valleys constituting spaced, chisel-like teeth 8 adapted to engage the surfaces to be scaled. When in the operative position shown in Fig. 3, the margins of the blade are guided and held at acute angles to the surface 9 of the fish to be scaled and the upper surfaces of the teeth 8 are retained at an acute angle A relative to the surface 9 which does not exceed 45 degrees. The bottom surfaces 10 of the teeth are ground so that they lie substantially flat on the surface to be scaled. This guards against penetration or cutting of the fish skin while the teeth are passed under the scales to separate them from the surface 9. The fish scales indicated by the numeral 11 are thus separated from the skin and caused to slide up the inclined outer surfaces of the teeth to the convex top surface of the blade 5 where they are collected. The central portion of the blade 5 is preferably offset upward from the undulating margins to provide a cavity from ⅜ to ½ inch deep. The handle 6 has a concave upper surface 6a to receive the thumb of the operator and facilitate control during the lateral oscillating movement of the tool when in use.

Figure 3:
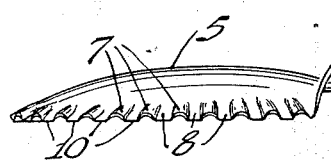
Fig. 3 is a cross section through the blade, taken approximately on the line 3—3 of Fig. 2 and showing it in operative relation to the surface of a fish to be scaled.
Figure 4:
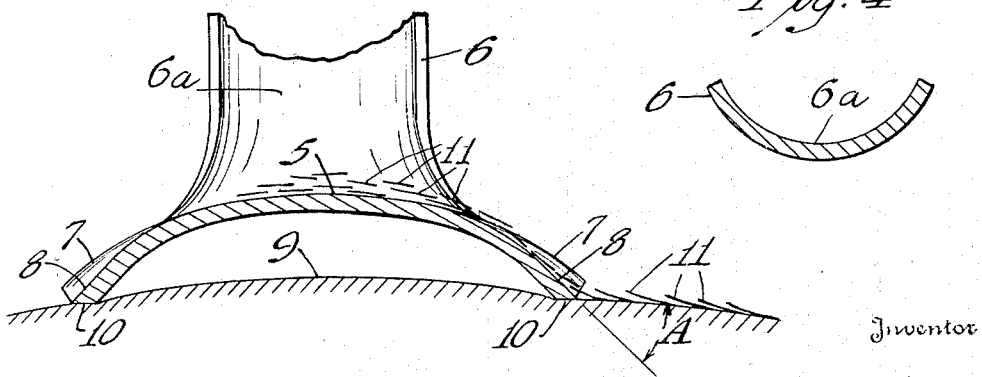
Fig. 4 is a cross section through the handle taken on the line 4—4 of Fig. 2.

In operation, the handle 6 is grasped and both of the opposite side edges of the blade are applied to the surface to be scaled, as indicated in Fig. 3, while the tool is moved with a lateral oscillating movement and the teeth 8 at one side are moved against the exposed edges of the scales 11. Sufficient force is thus applied to cause the teeth 8 to lift the scales and remove them from the surface 9. It will be evident that only one arcuate edge of the tool is used at a time and the effect of this is to cause the scales to pass up one side of the blade while the opposite margin merely slides over the surface to be scaled thereby maintaining the operating teeth in proper angular relation to the surface 9. Accumulations of the scales on the top of the blade 5 may be removed periodically by rinsing the tool in water or by wiping the top surface on any convenient material.

The width and spacing of the teeth 8 is such as to permit them to pass beneath individual scales thereby concentrating the force and efficiently freeing the scales by the application of wedge-like cutting force. When the tool is to be used for scaling ordinary fresh water game fish, for example, teeth approximately ⅛ inch in width and spaced approximately ⅛ inch apart have been found to operate with ease and rapidly. A tool formed as described is adapted for use in scaling fish of a wide variety of sizes and having surfaces to be scaled of various curvatures. By extending the handle 6 at an acute angle upward from the blade, I facilitate the operation and avoid contact of the operator's hand with the surface to be scaled or with other portions of the fish.

Having described my invention, what I claim as new and desire to protect by Letters Patent is:

1. A tool for scaling fish comprising, a blade having a sharpened, undulating margin defining a multiplicity of chisel-like teeth adapted to extend obliquely beneath the individual scales, each of said teeth having a bevel face of substantial width disposed to lie flat on the surface to be scaled and an upper face disposed at an acute angle to said surface and said blade having a top surface disposed in unobstructed continuation of said upper faces of the teeth to slidably receive scales therefrom a handle projecting from said blade and means spaced laterally from said undulating margin and adapted to slidably engage the surface to be scaled for retaining said upper faces of the several teeth at a predetermined acute angle to said surface.

2. A tool for scaling fish comprising, a blade having a concave bottom surface, a handle projecting from said blade and spaced, oppositely disposed edge portions formed on said blade to simultaneously engage the surface to be scaled, at least one of said edge portions having a beveled chisel-like edge having an upper face formed to extend at an acute angle to the surface to be scaled when both of said edge portions are in engagement with said surface and a flat bottom face of substantial width adapted to lie flat on the surface to be scaled.

3. A tool for scaling fish comprising, a blade having a concave bottom surface, a handle projecting obliquely upward from said blade and spaced, oppositely disposed edge portions formed on said blade to simultaneously contact the fish to be scaled, at least one of said edge portions being formed with chisel-like teeth adapted to pass obliquely beneath the scales and having upper faces disposed at acute angles not exceeding 45 degrees to the surface of the fish when both of said edge portions are in contact therewith, said teeth having bevel faces of substantial width adapted to lie flat on the surface of the fish to be scaled.

4. A tool for scaling fish comprising, a blade having a concave bottom surface, a handle projecting from one side of said blade and undulated, arcuate edge portions of said blade extending along the other three sides thereof to engage the surface to be scaled, the central portion of said blade having an upper surface adapted to receive the scales from said arcuate edge portions and said edge portions having bevel faces of substantial width disposed to lie flat on the surface to be scaled and upper faces disposed at acute angles to said surface and in unobstructed continuation of said upper surface of the central portion of the blade.

5. A tool for scaling fish comprising, a blade of inverted spoon shape, a handle projecting from one side of said blade, undulated, arcuate edge portions of said blade extending along opposite sides thereof and forming teeth extending at acute angles to the surface to be scaled, each of said teeth having a bevel face of substantial width disposed to lie flat on the surface to be scaled and an upper face disposed at an acute angle to said surface, and said blade having a top surface disposed in gradually sloping unobstructed continuation of said upper faces of the teeth to receive scales therefrom.

6. In a tool for scaling fish, a blade having spaced, oppositely inclined beveled edge portions adapted to simultaneously contact the fish to be scaled, the central portion of said blade being offset upward from said edge portions and said edge portions having bottom faces of substantial width adapted to lie flat on the surface of the fish and upper faces disposed at acute angles to the surface of the fish and in unobstructed continuation of the upper surface of said central portion of the blade whereby the scales when removed from a fish may slide to the upper surface of said central portion of the blade.

ALFRED A. KOLLANDER.

REFERENCES CITED

The following references are of record in the file of this patent:

UNITED STATES PATENTS

| Number | Name | Date |
|---|---|---|
| 1,369,207 | Wilson | Feb. 22, 1921 |
| 1,997,339 | Olson | Apr. 9, 1935 |
| 2,396,388 | Reenstierna | Mar. 12, 1946 |